US008144376B2

(12) United States Patent
Zomet et al.

(10) Patent No.: US 8,144,376 B2
(45) Date of Patent: *Mar. 27, 2012

(54) LENSLESS IMAGING WITH CONTROLLABLE APERTURES

(75) Inventors: Asaf Zomet, New York, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/895,853

(22) Filed: Oct. 1, 2010

(65) Prior Publication Data

US 2011/0157393 A1    Jun. 30, 2011

Related U.S. Application Data

(63) Continuation of application No. 11/377,742, filed on Mar. 16, 2006, now Pat. No. 7,830,561.

(60) Provisional application No. 60/662,270, filed on Mar. 16, 2005.

(51) Int. Cl.
*H04N 1/04* (2006.01)

(52) U.S. Cl. ........ 358/475; 358/474; 358/509; 359/462; 359/466; 396/457; 396/459; 348/362; 348/222.1

(58) Field of Classification Search .................. 358/474, 358/484, 488, 475, 509, 487; 359/462, 466, 359/224.1; 396/457, 459, 471; 348/222.1, 348/335, 362, 364
See application file for complete search history.

(56) References Cited

U.S. PATENT DOCUMENTS

| | | | | |
|---|---|---|---|---|
| 5,212,582 A | * | 5/1993 | Nelson | 359/224.1 |
| 5,448,395 A | * | 9/1995 | Lopez et al. | 359/224.1 |
| 5,616,912 A | * | 4/1997 | Robinson et al. | 250/201.1 |
| 5,699,444 A | * | 12/1997 | Palm | 382/106 |
| 5,797,050 A | * | 8/1998 | Smith | 396/241 |
| 5,969,872 A | * | 10/1999 | Ben Oren et al. | 359/621 |
| 5,987,591 A | * | 11/1999 | Jyumonji | 700/259 |
| 7,154,551 B2 | * | 12/2006 | Kuriyama et al. | 348/335 |
| 7,651,282 B2 | * | 1/2010 | Zomet et al. | 396/457 |
| 7,830,561 B2 | * | 11/2010 | Zomet et al. | 358/484 |
| 2009/0246402 A1 | * | 10/2009 | Mataki et al. | 427/534 |

* cited by examiner

*Primary Examiner* — Negussie Worku
(74) *Attorney, Agent, or Firm* — Byrne Poh LLP

(57) ABSTRACT

Embodiments of the present invention provide a lensless optical device for acquiring an image. The device can include a light attenuating layer having a plurality of elements, where transmittance of each of the plurality of elements is controllable, and an image detector disposed at a distance from the light attenuating layer, the image detector configured to acquire an image with light that passes through the light attenuating layer. The device also can include a light attenuating layer controller configured to simultaneously control transmittance of each of the plurality of elements independent of each other. Methods of detecting and tracking an object in a scene are also disclosed.

20 Claims, 16 Drawing Sheets

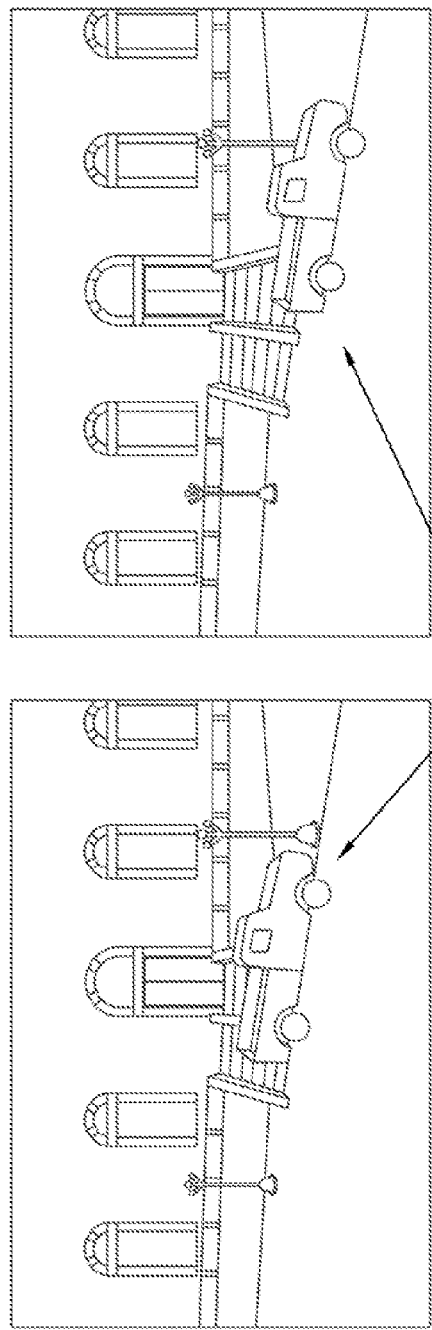
FIG. 6a
FIG. 6b
FIG. 6c
FIG. 6d

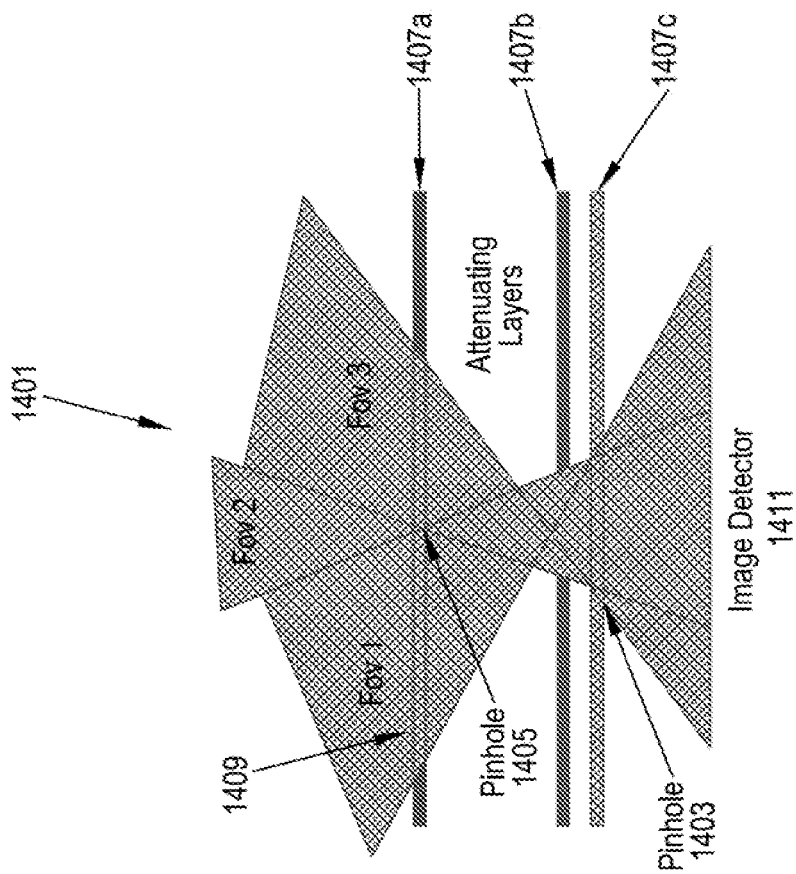
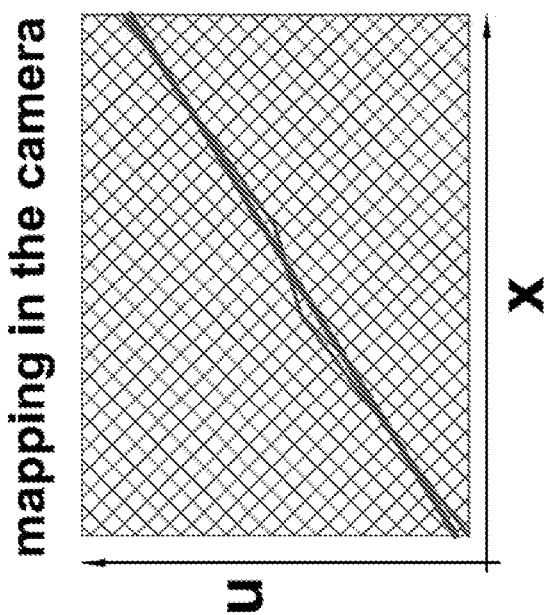
FIG. 14a
FIG. 14b

LENSLESS IMAGING WITH CONTROLLABLE APERTURES

CROSS-REFERENCE TO RELATED APPLICATION

This application is a continuation of U.S. patent application Ser. No. 11/377,742, filed Mar. 16, 2006, which claims priority under 35 U.S.C. §119(e) from U.S. Provisional Patent Application No. 60/662,270, filed Mar. 16, 2005, which are hereby incorporated by reference herein in their entireties.

STATEMENT REGARDING FEDERALLY SPONSORED RESEARCH OR DEVELOPMENT

The invention was made with government support under Grant No. ITR-00-85864 awarded by the Information Technology Research for National Priorities of the National Science Foundation (NSF/ITR). The government has certain rights in the present invention.

FIELD OF THE INVENTION

The present invention relates to lensless imaging. More particularly, embodiments of the present invention relate to lensless imaging devices and methods for acquiring images using a light attenuating layer with controllable apertures.

BACKGROUND OF THE INVENTION

Most conventional cameras use lenses to focus light on image planes to form bright and sharp images. In spite of the desirable features that lenses provide, lenses constrain the mapping from the scene to the image. For example, lens cameras severely restrict the geometry and photometry of the imaging process. As a result, conventional video cameras provide limited control over their imaging properties. This has a direct implication on the way computer vision systems are designed in terms of sensing and algorithms.

FIG. 1a is a cross-sectional view illustrating a conventional ideal lens camera 100. As shown, lens 101 integrates light 109 emanating from a point 111a in the scene 107 on the plane 105 in focus to a corresponding point 111b on the image detector 103. Therefore, lens 101 focuses plane 105 to the plane of image detector 103. Without moving lens 101 and/or image detector 103, the viewing direction and the focus of this lens camera cannot be changed. Motors (e.g., pan-tilt motors) can be used to move lens 101 and/or image detector 103, however, motors are limited by mechanical constraints and produce motion blur. In addition, this camera 100 can only acquire an image of an entire field of view together and is constrained to distribute the limited resolution of the detector 103 uniformly over an entire field of view.

In recent works, cameras that are more flexibly controllable were proposed. One proposed camera includes lenses and an array of micro-mirrors. By controlling the orientations of the micro-mirrors, pixel-wise multiplications in the optics and instantaneous changes of viewing directions can be performed. In another case, a camera with a lens and a light attenuator was proposed, which can also perform pixel-wise multiplications. These proposed cameras, while highly controllable, use one or more lens to focus a scene on an image detector.

Instead of using lenses, conventional pinhole cameras use small apertures for light collection. Conventional pinhole cameras are capable of acquiring an image of a wide field of view without incurring geometric distortions. However, conventional pinhole cameras also suffer from the kinds of inflexibility facing lens cameras.

SUMMARY OF THE INVENTION

Embodiments of the present invention provide highly flexible lensless imaging devices and methods of acquiring images that overcome many of the limitations of conventional cameras. In some embodiments, the devices include an image detector and one or more light attenuating layers which can be parallel to each other. The transmittance of the light attenuating layers is controllable in space and time. By applying different transmittance patterns to the light attenuating layers, it is possible to modulate the incoming light in useful ways and acquire images that are not possible to acquire with conventional cameras. The light attenuating layers can be liquid crystal displays made from liquid crystal sheets, digital micromirror devices, or liquid crystal on silicon devices.

In some embodiments, the device can change its viewing direction instantaneously to arbitrary directions by merely modifying the transmittance pattern of the aperture. In other embodiments, the device can acquire images of disjoint regions of interest in a scene without having to acquire the regions in between. Therefore, the device can select which parts of the scene to acquire an image of at each time instance, and can simultaneously acquire images of far apart moving objects with higher resolution.

In some embodiments, the device can be used as a computational sensor, where the computations are performed by the optics, and the results of the computations can be acquired as an image by the image detector. Furthermore, the same physical device can implement all of these different imaging functionalities and can switch these functionalities from one frame to the next.

Embodiments of the present invention provide an optical device for acquiring an image. The device includes a first light attenuating layer having a plurality of elements, each having a transmittance, where the transmittance of each of the plurality of elements is controllable. The device further includes an image detector disposed at a distance from the light attenuating layer, the image detector configured to acquire an image from light that passes through the light attenuating layer, and a light attenuating layer controller configured to simultaneously control transmittance of each element of the light attenuating layer independent of each other. The device acquires an image without using a lens.

The light attenuating layer can include a liquid crystal sheet, a digital micromirror device, or a liquid crystal on silicon device. In some embodiments, the transmittance of each element of the light attenuating layer is controllable between at least one translucent state and at least one opaque state.

In some embodiments, the light attenuating layer controller of the device is further configured to create and/or move an aperture within the first light attenuating layer, the aperture including at least one element of the first light attenuating layer having a higher transmittance than elements surrounding the aperture. The device can further include an image analyzer coupled to the image detector and configured to detect an image of a moving object within an image acquired by the image detector, a position determination component coupled to the image analyzer and configured to determine the position of the moving object image within the acquired image, and a view determination component coupled to the position determination component and configured to determine a field of view expected to contain the moving object at a later time based on the determined position. The light attenuating layer controller can be configured to move the aperture to another position within the light attenuating layer corresponding to the determined field of view, thereby enabling the image detector to acquire another image containing the moving object at the later time.

In some embodiments, the device can further include at least one additional light attenuating layer disposed at a distance from the image detector different from that of the first light attenuating layer. The light attenuating layer controller can be further configured to create at least one additional aperture within the at least one additional light attenuating layer. The light attenuating layer controller can be further configured to form a plurality of disjointed fields of view.

The device can further include an image analyzer coupled to the image detector and configured to detect an image of a moving object within an image acquired by the image detector, a position determination component coupled with the image analyzer and configured to determine the position of the moving object image within the acquired image, and a view determination component coupled with the position determination component and configured to determine a field of view expected to contain the moving object at a later time based on the determined position. The light attenuating layer controller can be further configured to move the apertures to change one of the plurality of disjointed fields of view to the determined field of view, thereby enabling the image detector to acquire another image containing the moving object at the later time.

In some embodiments, the light attenuating layer controller is further configured to create within the at least one additional light attenuating layer at least one aperture containing the at least one additional aperture. The aperture containing the at least one additional aperture has a transmittance lower than the at least one additional aperture.

In some embodiments, the device can further include an image processing component. The image detector can acquire an image of distinct parts of a scene at different focal lengths, and the image processing component can be configured to computationally remove blur in the image acquired by the image detector.

In some embodiments, the light attenuating layer controller of the device can be further configured to create an image template representing an object within the first light attenuating layer. The image template and the apertures can be located such that an image of a scene and a correlation image formed by applying an optical correlation or convolution of the scene with the image template are both acquired by the image detector. The device can further include an image analyzer coupled to the image detector and the light attenuating layer controller, where the image analyzer is configured to detect an image of the object within the acquired image of the scene using the acquired correlation image.

Various embodiments of the present invention provide methods for tracking a moving object using a lensless imaging device. In some embodiments, a method includes acquiring a first image from light that passes through an aperture of the imaging device, detecting an image of the moving object within the first image, and determining a first position of the moving object image within the first image. In addition, the method includes determining a field of view expected to contain the moving object at a later time based on the determined first position, moving the aperture to a second position corresponding to the determined field of view without moving the imaging device, and acquiring a second image with the determined field of view. The first image can include disjointed portions of a scene. Also, different portions of the first image can be acquired with different resolution.

In some embodiments, a method of detecting an object in a scene is provided. The method includes creating an image template representing the object and an aperture, acquiring a correlation image formed by applying an optical correlation or convolution of the scene with the image template, acquiring an image of the scene using the aperture, computing a normalized correlation of at least a portion of the acquired scene image using the acquired correlation image, and detecting an image of the object in the acquired scene image based on the computed normalized correlation.

BRIEF DESCRIPTION OF THE DRAWINGS

The Detailed Description of the Invention, including the description of various embodiments of the invention, will be best understood when read in reference to the accompanying figures wherein:

FIG. 6a is a diagram illustrating a field of view using a lensless imaging device according to various embodiments of the present invention;

FIG. 6b is a diagram illustrating another field of view using the same lensless imaging device as in FIG. 6a;

FIG. 6c is a diagram illustrating an acquired image corresponding to FIG. 6a;

FIG. 6d is a diagram illustrating an acquired image corresponding to FIG. 6b;

FIG. 14a is a diagram illustrating a scene-to-image mapping corresponding to a device of various embodiments of the present invention;

FIG. 14b is a diagram illustrating a device for achieving the scene-to-image mapping in FIG. 14a;

DETAILED DESCRIPTION OF THE INVENTION

Figure 1B:
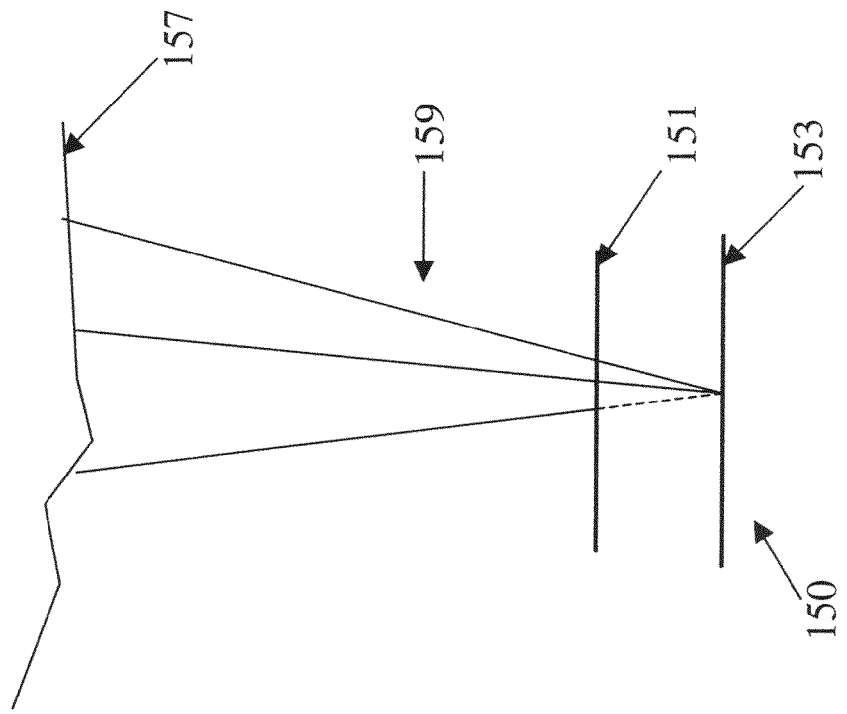
FIG. 1b is a cross-sectional view of a lensless imaging device according to various embodiments of the present invention.
Figure 1A:
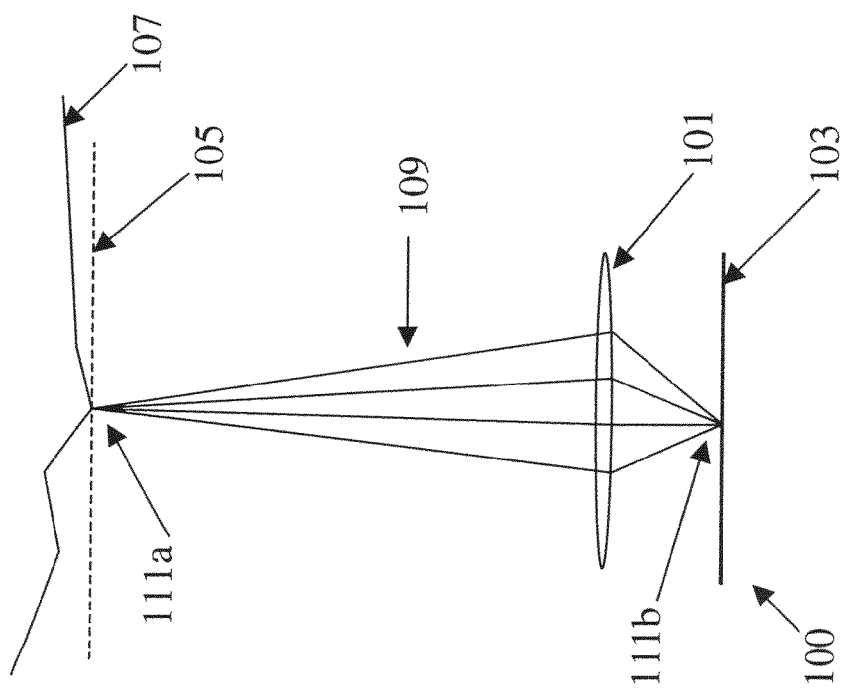
FIG. 1a is a cross-sectional view illustrating a conventional ideal lens camera.

Embodiments of the present invention provide lensless imaging devices and methods. Without lenses, devices of the present invention can be made very compact and inexpensive. FIG. 1b is a cross-sectional view of a lensless imaging device 150 of various embodiments of the present invention. Device 150 includes an image detector 153 and a light attenuating layer 151. Light attenuating layer 151 allows some of the light rays 159 emanated from a scene 157 to reach image detector 153, but attenuates or blocks some other light rays 159. Different from a conventional lens camera 100 shown in FIG. 1a, device 150 has no focusing. Each point on the image detector can potentially integrate light emanating from the entire field of view as allowed by light attenuating layer 151. Therefore, device 150 modulates the 4D light field associated with image detector 153 prior to the acquisition of a 2D image.

Figure 2B:
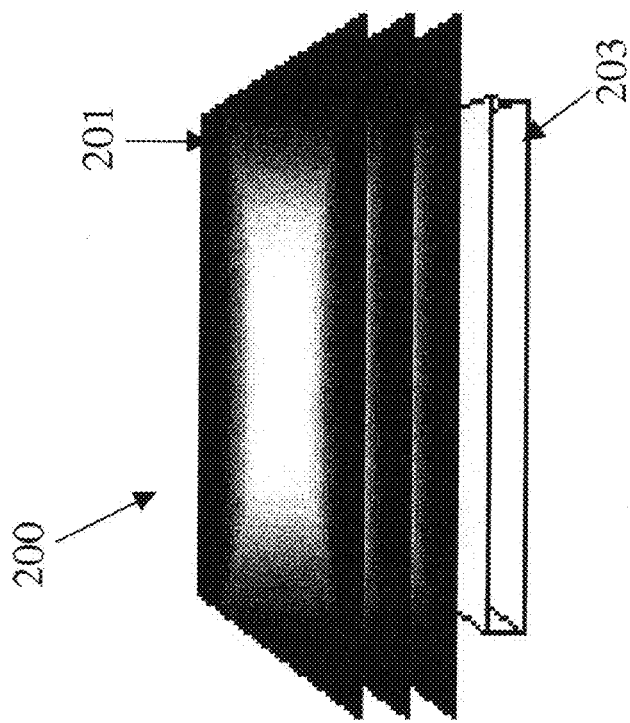
FIG. 2b is a side view of another lensless imaging device according to various embodiments of the present invention.
Figure 2A:
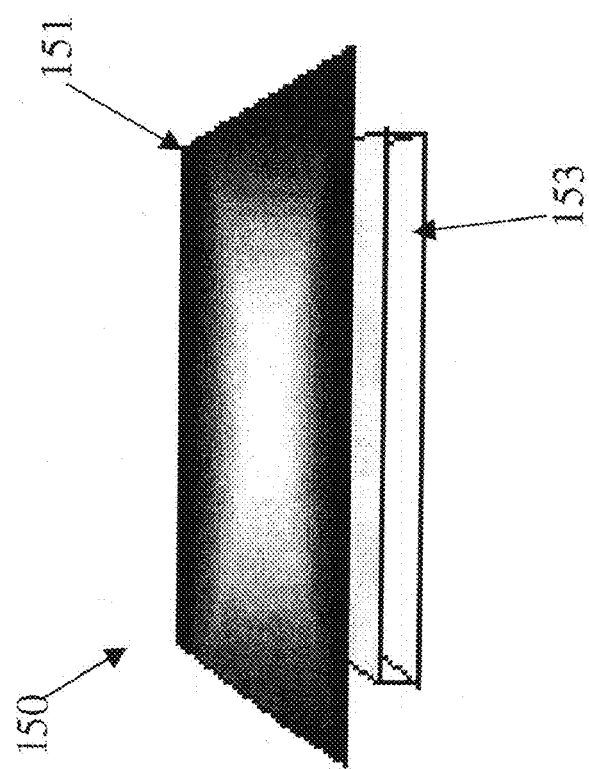
FIG. 2a is a side view of the device illustrated in FIG. 1b.

FIG. 2a is a side view of device 150. Light attenuating layer 151 includes a plurality of light transmitting elements and can be placed in parallel with image detector 153. In some embodiments, layer 151 can be a liquid crystal sheet of the type used in a liquid crystal display ("LCD"). Alternatively, layer 151 can be a digital micromirror device ("DMD") or a liquid crystal on silicon device ("LCOS"). FIG. 2b is a side view of another device 200 of various embodiments of the present invention. Different from device 150, device 200 includes multiple light attenuating layers 201 that can be disposed parallel with each other and with image detector 203.

Figure 3:
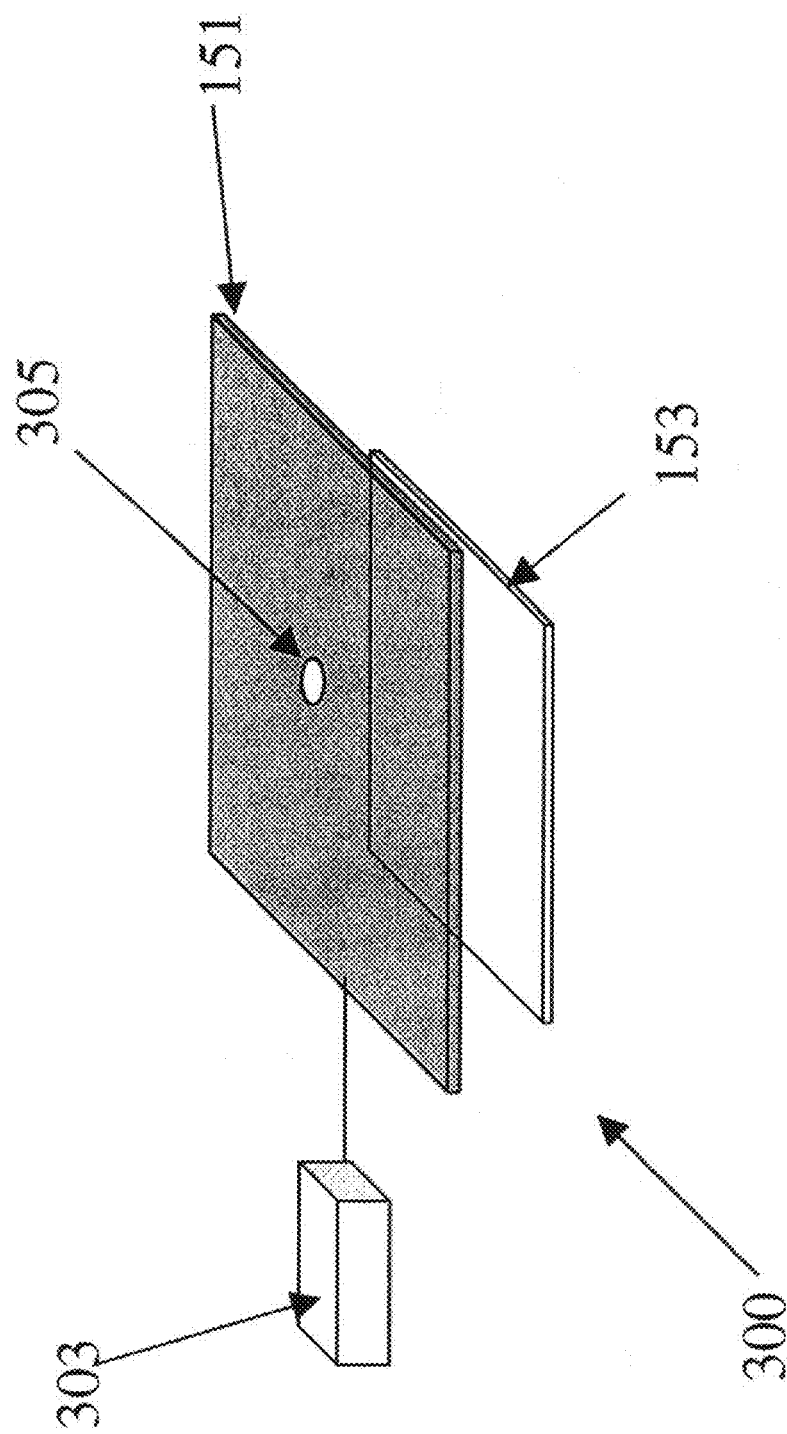
FIG. 3 is a side view of yet another lensless imaging device according to various embodiments of the present invention.

FIG. 3 is a side view of a device 300 of various embodiments of the present invention. In addition to image detector 153 and light attenuating layer 151, device 300 includes a light attenuating layer controller 303 coupled to light attenuating layer 151. Controller 303 can simultaneously and independently control light transmittance of elements of light attenuating layer 151. For example, controller 303 can form an aperture 305 on layer 151. An aperture as used in this context is one or more elements (or pixels) of a light attenuating layer having a higher transmittance than surrounding elements. Device 300 can also include multiple light attenuating layers similar to device 200 illustrated in FIG. 2b.

In device 300, light attenuating layer 151 is preferably placed within a short distance from image detector 153, which is explained below. Existing lensless cameras, such as pinhole cameras, are inferior to lens cameras in terms of image brightness and sharpness. However, the limitations of a pinhole camera can be minimized by placing aperture 305 close to the image detector 153. For a distant scene and light wavelength of $5.5 \times 10^{-4}$ mm, the Rayleigh formula provides that there exists an optimal pinhole/aperture diameter a (measured in mm):

$$a = \sqrt{3.6 \times 5.5 \times 10^{-4} \times f}, \quad (1)$$

where f is the distance between aperture 305 and the image plane. A larger aperture produces a larger blur due to the overlap of the solid angles at adjacent image points subtended by the aperture. A smaller aperture produces a larger blur due to diffraction. A key observation with regard to equation (1) is that the optimal aperture diameter grows with f since diffraction blur grows with f, whereas the blur due to solid angle overlap is largely constant as a function of f. Hence, sharpness is improved when aperture 305 is placed closer to image detector 153.

The second limitation of lensless imaging systems is image brightness. Image brightness depends on the brightness of the scene, the sensitivity and integration time of the detector and the optics. The light-gathering power of the optics is expressed by the f-number, which is the ratio between the distance of the aperture and its diameter. The f-number of a pinhole camera becomes lower (which is better) when the pinhole is placed closer to the image detector. Therefore, both the image sharpness and the f-number improve when aperture 305 is placed close to image detector 153. There is a factor, however, that limits the proximity of aperture 305 and image detector 153. When the distance between aperture 305 and image detector 153 is small relative to the size of detector 153, foreshortening effects become prominent, and off-center areas of an image are severely attenuated.

Figure 4:
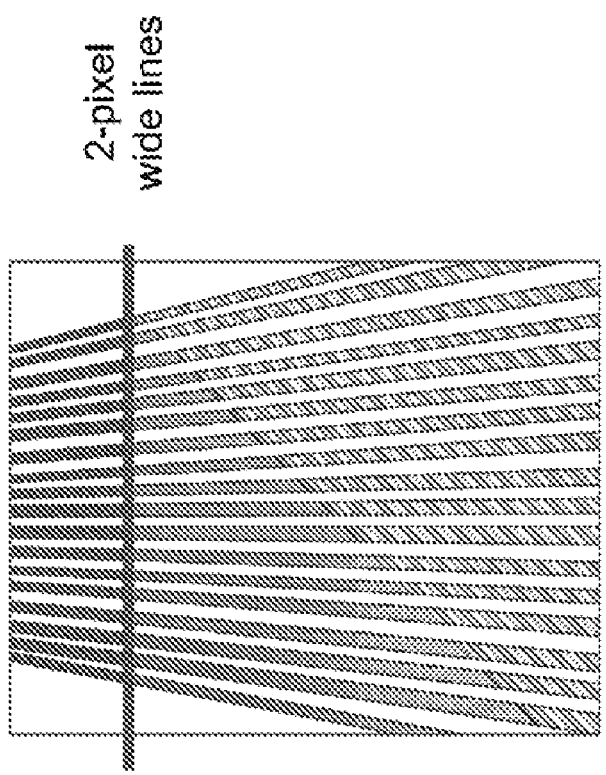
FIG. 4 illustrates a patch taken from an acquired image that would be produced in certain embodiments of the present invention.

For example, image detector 153 can be a Sony XC-77 of size 8.8 mm×6.6 mm (type ⅔ inch) with a resolution of 640×480. Aperture 305 of diameter 200 μm is placed at a distance of 6 mm from detector 153. This distance is chosen to assure that foreshortening effects are not prominent and can be compensated for in software. The resolution that can be achieved using this setup is illustrated in FIG. 4, which is a patch taken from an acquired image. As can be seen, lines of width 2 pixels are easily separated. In terms of image brightness, the f-number of this imaging system is 6/0.2=30. This is a relatively high f-number. However, the detector of this system is relatively large; the light gathering power of this system is equivalent to the power of a standard type ⅓ inch video detector (of size 4.8 mm×3.6 mm) with f-number 16. Therefore, a resolution of 640×480 and the equivalent off-number 8 can be achieved by using a detector of twice the size, with dimensions 18 mm×13.5 mm (type 4⁄3 inch).

In device 300, the total light incident on image detector 153 can be intensified by increasing the transmittance of aperture 305. However, this will introduce blur to the images. To resolve this problem and increase image brightness, multiple apertures can be created. This approach was studied in highenergy astronomy, where multiple pinholes form a "coded aperture". The locations of these pinholes can be designed to obtain an optimal reconstruction. In other words, a transmittance pattern is used so that the image blur can be removed computationally. For this design to be effective, the solid angle viewed by all image points should be bounded. This can be done with device 300 by using a multi-layer aperture formed on multiple light attenuating layers: one layer for the coded aperture, and another layer to block the field of view.

Figure 5:
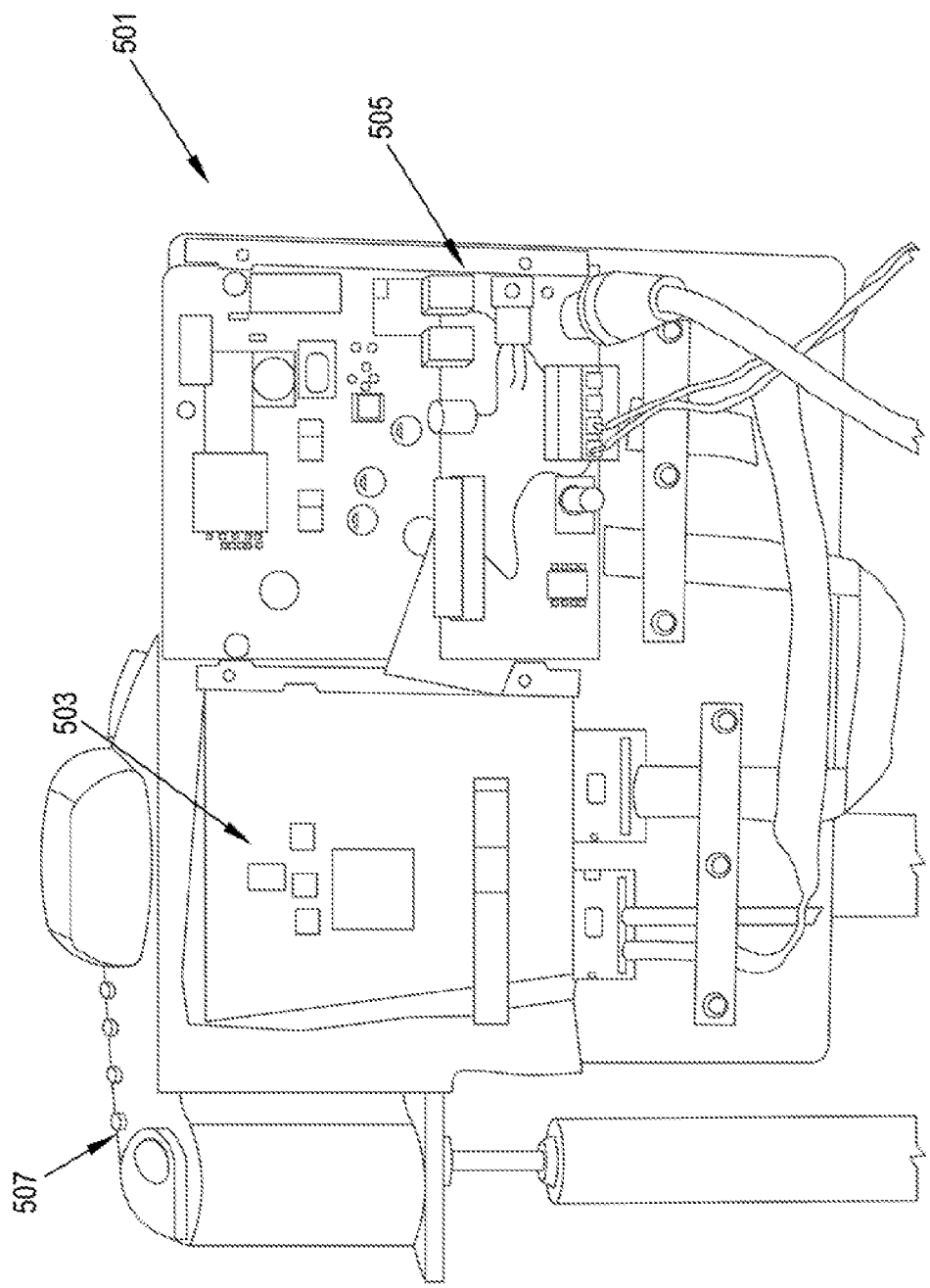
FIG. 5 is a diagram illustrating a prototype implementation of a lensless imaging device according to various embodiments of the present invention.

FIG. 5 is a diagram illustrating a prototype implementation of a device 501 of various embodiments of the present invention. Device 501 includes light attenuating layer 503 which is an off-the-shelf LCD (MTR-EVUE-4BW provided by Earth-LCD). Device 501 also includes image detector 507 constructed from an off-the-shelf digital camera (Canon EOS-20D) with the lenses removed. In order to acquire high quality images, ideally the pixels on layer 503 should be as close as possible to the optimal aperture/pinhole size, which depends on the distance of layer 503 from detector 507 (see equation (1) above). In this example, layer 503 is attached to the lens mount of the Canon EOS-20D at a distance of 55 mm, therefore the optimal aperture/pinhole size is 0.33 mm×0.33 mm.

Layer 503 also preferably has a high contrast ratio to be able to approximate zero transmittance, and elements of layer 503 are preferably square. However, because commercially available high contrast LCDs have 3 sub-pixels (R; G; B) per pixel, so that the physical pixels have an aspect ratio close to 1:3, an LCD which has close-to-square pixels (0.21 mm×0.26 mm) and a published contrast ratio of 50:1 has been selected for the prototype. The actual contrast ratio of the selected LCD is found to be 14:1 or less. Due to the low contrast ratio, LCD pixels that are supposed to block light, in practice, transmits considerable amounts of light. For this reason, most of the unused area of the prototype LCD has been blocked with cardboard.

In addition, light attenuation of LCDs depends on the viewing angle, and the LCD selected for the prototype has a lower contrast ratio in large angles. The LCD selected for the prototype also has a mild diffuse coating that introduces additional unwanted image blur. Hence, a LCD with a higher contrast ratio, better directionality, and without a diffuse coating may be used to provide better results.

To compensate for these limitations of the LCD, experiments using this prototype can be conducted by applying spatially varying photometric functions to the images. For example, a first image $I_1$ can be acquired by applying the desired transmittance pattern to the LCD. Then, a second image $I_0$ can be acquired by applying a uniform zero transmittance pattern. An ideal image acquired by a device without the limitations would be the difference between these images: $I=I_1-I_0$. In addition, for additional attenuating layers, physical elements that block the light can be used for experiments.

Various applications using the devices of various embodiments of the present invention are described as follows. Referring to FIG. 3, controller 303 can be used to create and control aperture 305 in space and time. Therefore, the imaging characteristics of device 300 can change dramatically from one frame to the next. For example, device 300 can be configured so that it can be used as a controllable pinhole camera. In this case, the transmittance pattern of layer 151 corresponds to a pinhole disk. At each time instance, device 300 can instantaneously shift aperture 305 to any arbitrary location within layer 151.

FIGS. 6a and 6b are diagrams that illustrate the effect of shifting aperture 305. FIGS. 6a and 6b show two different locations of aperture 305 on light attenuating layer 151, and the corresponding fields of view of device 300. FIGS. 6c and 6d illustrate the corresponding images acquired by device 300. As shown, a shift of aperture 305 induces a shift of the field of view to a different viewing direction. Therefore, by electronically shifting the location of aperture 305 on layer 151, device 300 can acquire images with dramatically different fields of view without moving device 300 mechanically. This is in contrast to pan/tilt lens cameras that change their viewing direction continuously and are limited by motion blur and mechanical constraints. Appendix A more precisely shows that for a distant scene, a shift of the aperture induces a shift of the image. As FIGS. 6c and 6d illustrate, device 300 can be used to track a moving object 601 without being physically moved.

Figure 7:
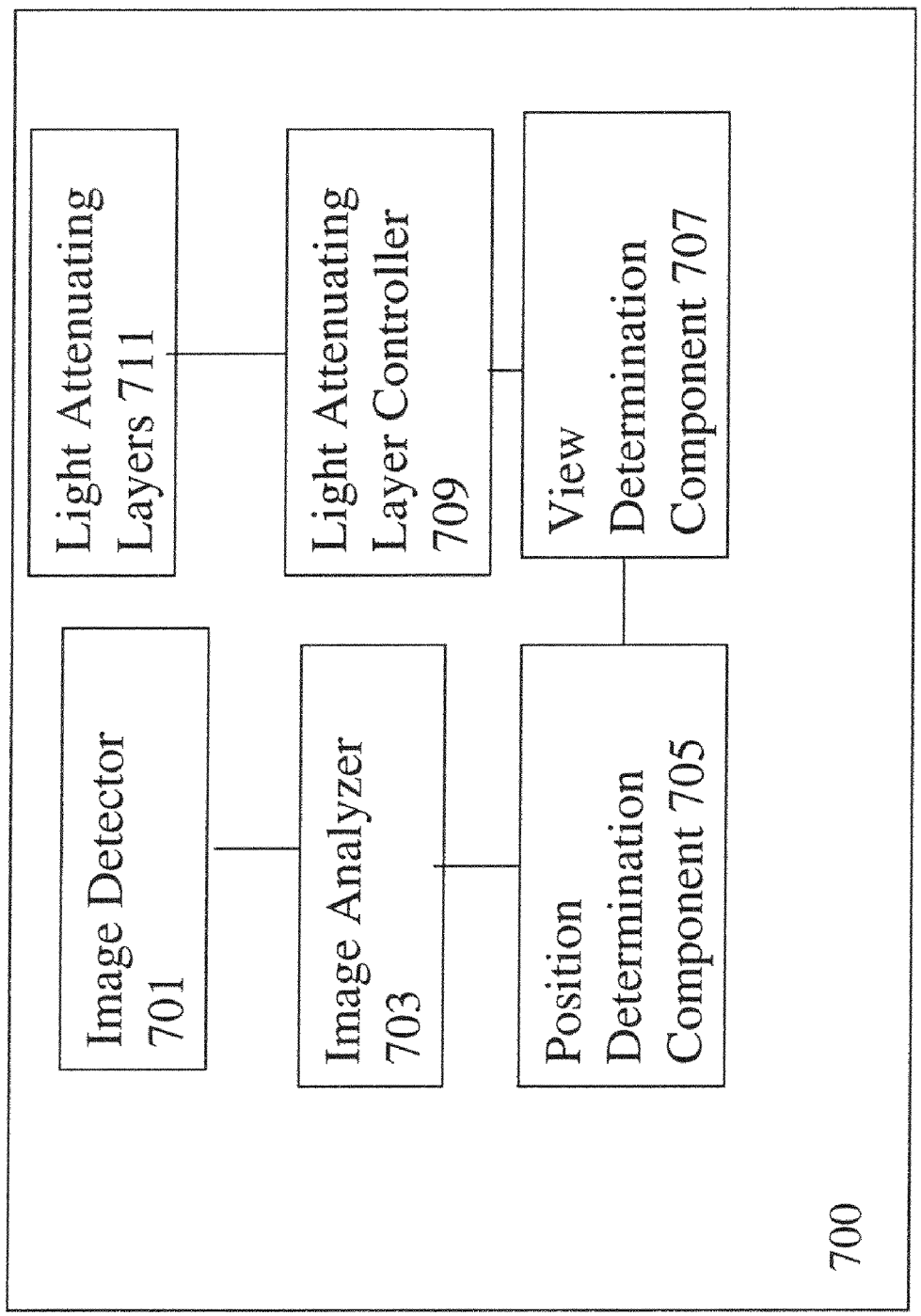
FIG. 7 is a block diagram of a system according to various embodiments of the present invention.

FIG. 7 is a block diagram of a system 700 of various embodiments of the present invention. System 700 includes an image analyzer 703 coupled with an image detector 701. Image analyzer 703 can be used to detect an image of a moving object in an image acquired by detector 701. Then, position determination component 705 can be used to determine the position of the moving object image, and view determination component 707 can use the determined position to calculate a field of view expected to contain the moving object at a later time, using tracking algorithms known in the art. Light attenuating layer controller 709 can then create or move apertures on the light attenuating layers 711 to form the determined field of view, enabling image detector 701 to acquire a second image containing the moving object. It should be noted that the functionality of dynamically shifting a field of view and/or tracking a moving object can be implemented with any other suitable technology that provides a highly controllable imaging device.

Devices of various embodiments of the present invention can also be used to perform computing in the optics. As illustrated in FIG. 1b, a device (e.g., device 150) of various embodiments of the present invention integrates attenuated light emanating from the entire field of view. This property can be exploited to utilize the device as a computational sensor. For example, as shown in FIG. 3, by selecting the appropriate transmittance pattern in aperture 305, device 300 can be programmed to perform a desired computation in the optics, so that the image detector 153 acquires the computed result in an image.

More specifically, in a scenario where the scene is distant from device 300 relatively to the size of the device, the scene-to-image mapping can be well approximated with a depth-independent mapping:

$$I(x,y)=\iint T(x-u,y-v)S_f(u,v)dudv. \quad (2)$$

where I(x, y) is the acquired image, T(x, y) is the transmittance of attenuating layer 151, and $S_f$ is the image that would be acquired by an ideal pinhole camera with a pinhole/aperture located at the center of the camera. This is derived in Appendix A (equation (10)). Hence, acquired image I(x, y) is a convolution of a scene by applying a transmittance function T(x, y) computed in the optics.

When the scene is close relative to the size of device 300, the measurements are largely influenced by the depth variation in the scene. A defocused lens camera device in conjunction with an attenuating layer may also be used to extract measurements that were used for estimating range maps.

In equation (2), the scene is represented by an image $S_f$ and the acquired image is the convolution of $S_f$ with the transmittance function T. Therefore, device 300 can perform convolutions (or correlations) of the scene image with pre-defined patterns in the optics. This can be useful in object detection tasks in which the image is typically convolved with a set of patterns. Different from most conventional optical computations, device 300 can perform computations on non-coherent light, where the computations are embedded within the imaging process.

Additionally, a multi-layer aperture allows a richer set of mappings. For a distant scene, the scene-to-image mapping is given by:

$$I(x) = \int \prod_{j=1}^{K} T_j\left(x - u\frac{f_j}{f_1}\right) S_f(u) du, \quad (3)$$

where $f_1 \ldots f_K$ are the distances of the layers, $T_1 \ldots T_K$ are the transmittance functions of the layers, and I, $S_f$ are the image and the scene respectively, similarly to equation (2). As can be readily seen from equation (3), a multi-layer aperture can produce scene-to-image mappings in which different image regions are associated with different imaging properties. This is derived in Appendix A (see equation (6)).

Therefore, using multiple light attenuating layers, it is possible to acquire both an image of a scene and one or more convolutions of the scene in parallel. Multiple optical operations can be applied to the same scene region, so that each sub-image acquires the result of a different optical operation. For example, the device can acquire a part of the scene with an aperture in one sub-image, and in parallel apply convolution optically to the same scene part and acquire it in another sub-image. In one application, the device can then utilize the acquired image to detect an object within the scene, as explained below.

Figure 8:
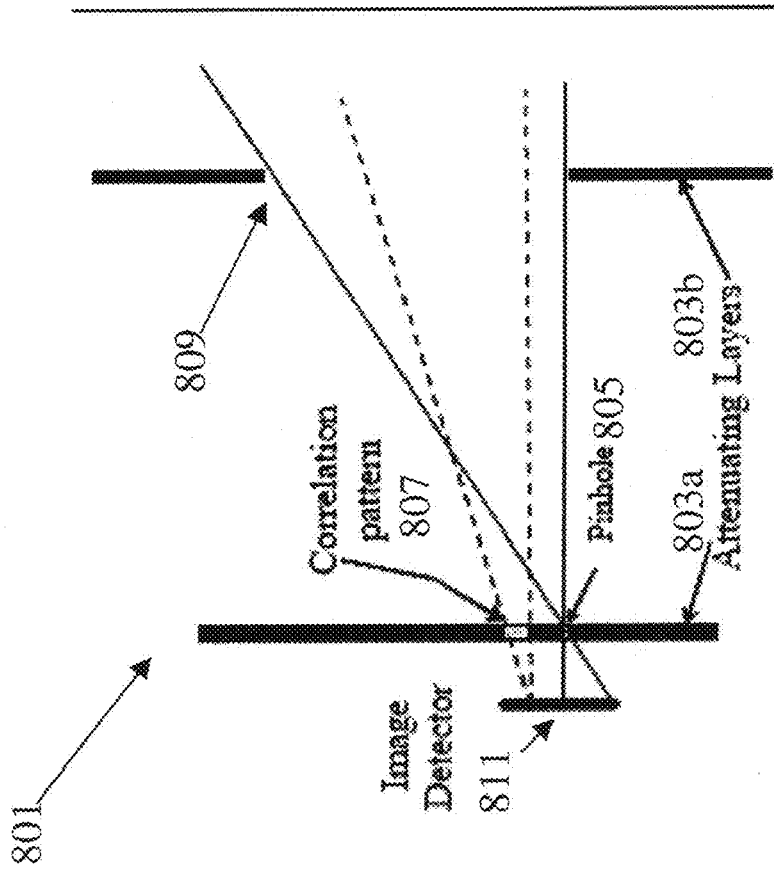
FIG. 8 is a cross-sectional view of a device according to various embodiments of the present invention.

FIG. 8 is a cross-sectional view of a device 801 of various embodiments of the present invention. Device 801 includes an image detector 811 and light attenuating layers 803*a* and 803*b*. On layer 803*a*, an aperture 805 and an image template 807 can be created together. Image template 807 can, for example, be a face template representing a human face. An aperture 809 can be created on layer 803*b*, limiting the field of view so that only the bottom part of image detector 811 acquires an image of a scene through aperture 805. The top part of image detector 811 can be used to acquire a correlation of the scene with template 807.

Figure 9A:
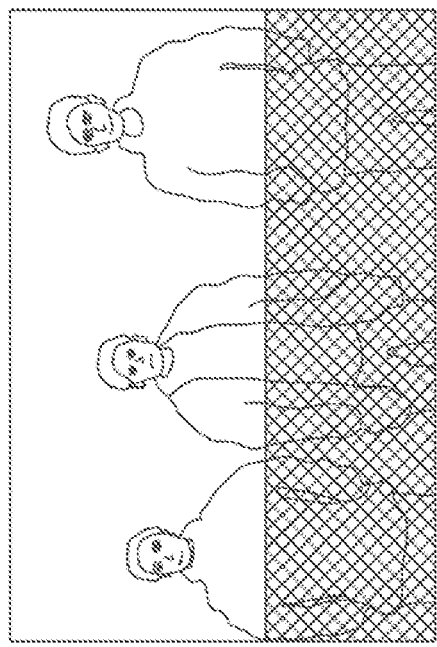
FIG. 9a is a diagram illustrating an image acquired by a conventional lens camera.
Figure 9B:
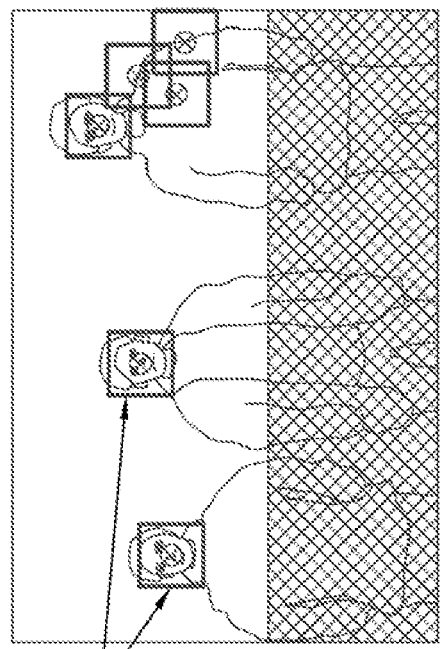
FIG. 9b is a diagram illustrating an image acquired by the device illustrated in FIG. 8.
Figure 9D:
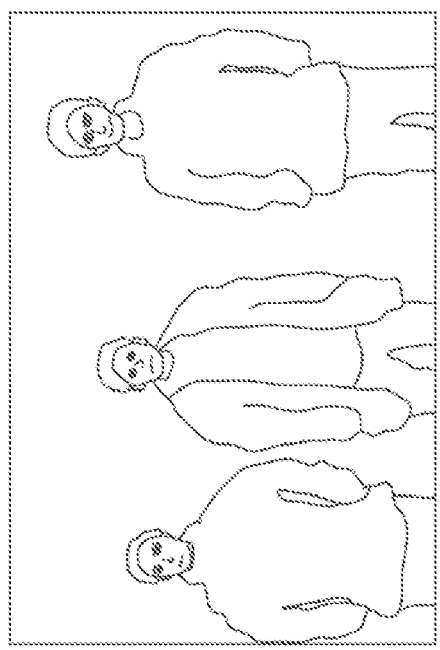
FIG. 9d is a diagram illustrating detected faces (shown in boxes) with some false detections.
Figure 9C:
FIG. 9c is a diagram illustrating a face template used as a correlation pattern in FIG. 8.

FIG. 9*a* illustrates an image 901 acquired by a conventional lens camera. FIG. 9*b* illustrates the same scene acquired by device 801 as image 903. As shown, the top portion of image 903, acquired with aperture 805, is the same as the top portion of image 901. The bottom portion of image 903 is acquired as a correlation of the top part of the scene with face template 807 (or a convolution with a flipped template). FIG. 9*c* illustrates face template 807 used as the transmittance pattern. Because the most computationally intensive part (convolution) was already done optically before the imaging, a normalized correlation can be obtained by computing the norms of the image blocks 905, which can be computed efficiently using the integral of images. FIG. 9*d* illustrates detected faces (shown in boxes) with some false detection. Although normalized correlation with a single template may not be sufficient for accurate and robust face detection, as shown in FIG. 9*d*, it can be used to significantly reduce the required computations.

Figure 10:
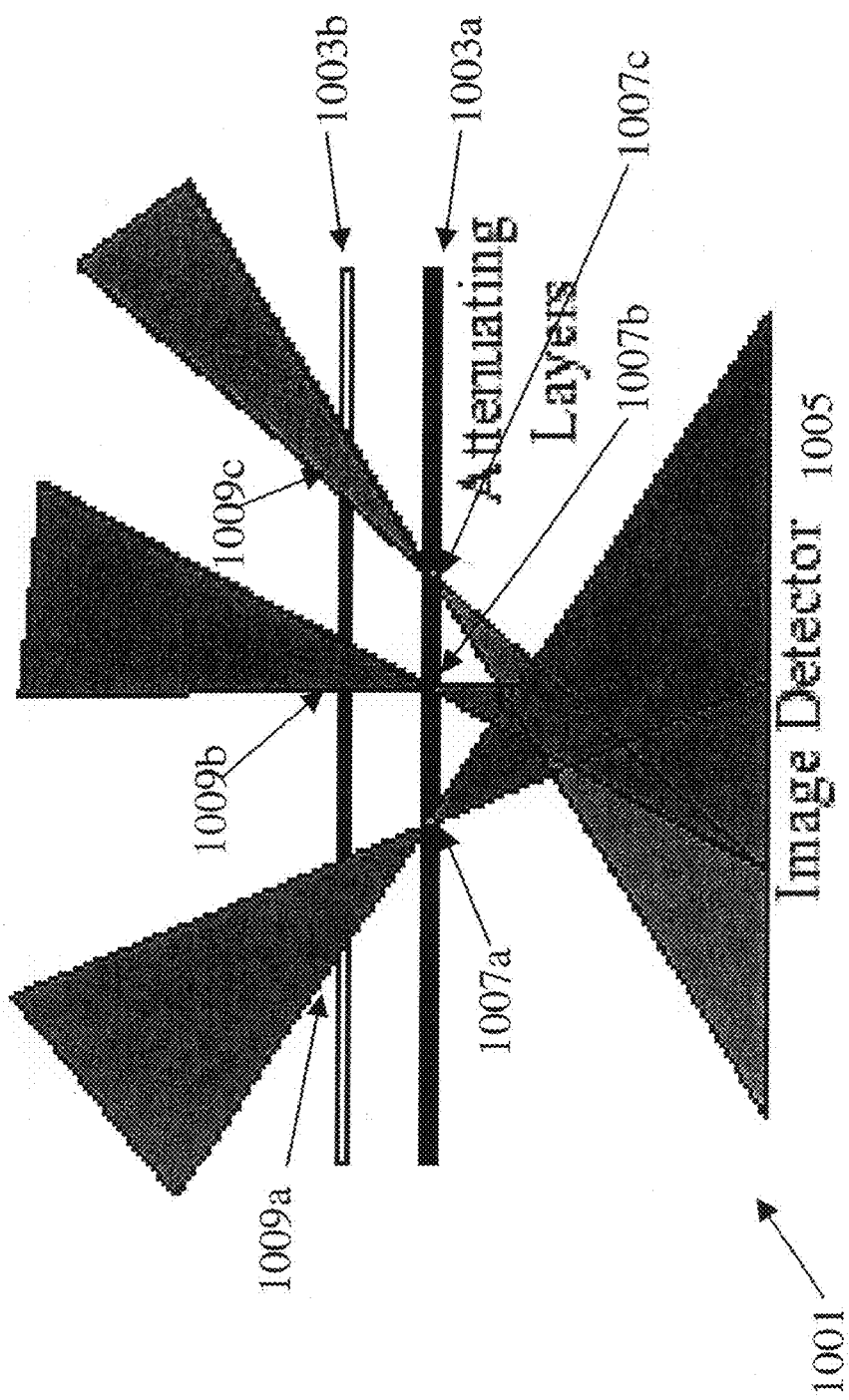
FIG. 10 is a cross-sectional view of a lensless imaging device according to various embodiments of the present invention.

FIG. 10 is a cross-sectional view of an imaging device 1001 that is used to acquire images with split fields of view. Device 1001 includes light attenuating layers 1003*a* and 1003*b*. Three small apertures 1007*a*, 1007*b*, and 1007*c* are located on layer 1003*a*. Three corresponding apertures 1009*a*, 1009*b*, and 1009*c* limit the field of view that can be acquired by image detector 1005 through apertures 1007*a*, 1007*b*, and 1007*c*. Hence, device 1001 acquires an image of disjoint parts of the scene simultaneously. Although device 1001 is shown as having two light attenuating layers 1003*a*, 1003*b*, the functionality of simultaneously acquiring images with split fields of view on a single image detector can be implemented with any other suitable technology that provides a highly controllable imaging device.

Figure 11A:
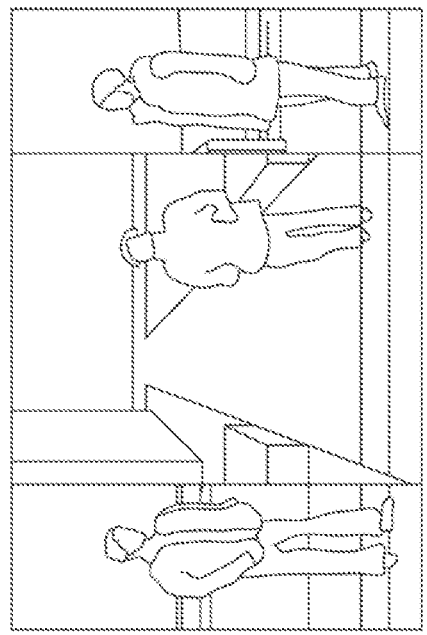
FIG. 11a is a diagram illustrating an image acquired by a conventional camera.
Figure 11B:
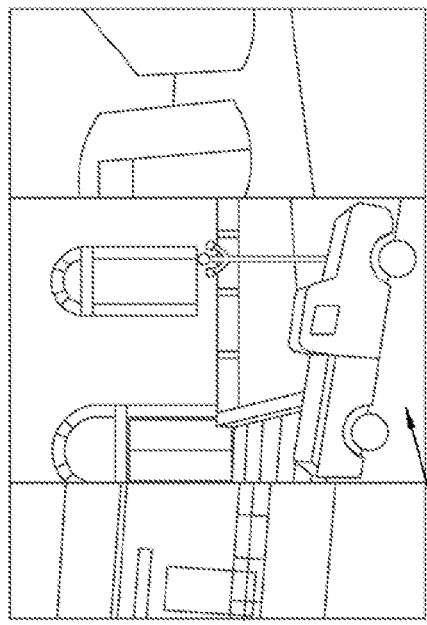
FIG. 11b is a diagram illustrating an image acquired by the device shown in FIG. 10.

FIGS. 11*a* and 11*b* illustrate the difference between device 1001 and convention cameras. In FIG. 11*a*, to acquire an image including all three subjects 1103 in the scene, a conventional camera needs to maintain a wide field of view. Therefore, an image of the three subjects 1103 is acquired with relatively low resolution. In contrast, as shown by FIG. 11*b*, device 1001 can split the image into sub-images and assign disjoint parts of the scene to each sub-image. Only an image of the three subjects 1103 and their surrounding regions are acquired by device 1001 and therefore an image including all three subjects 1103 can be acquired at a higher resolution.

Figure 11C:
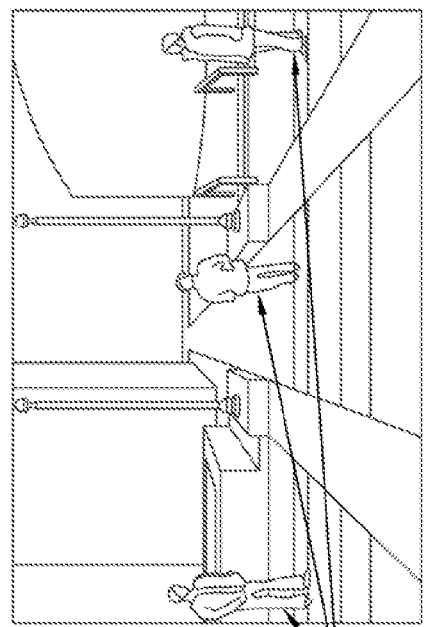
FIG. 11c is a diagram illustrating an image acquired by the device shown in FIG. 10.
Figure 11D:
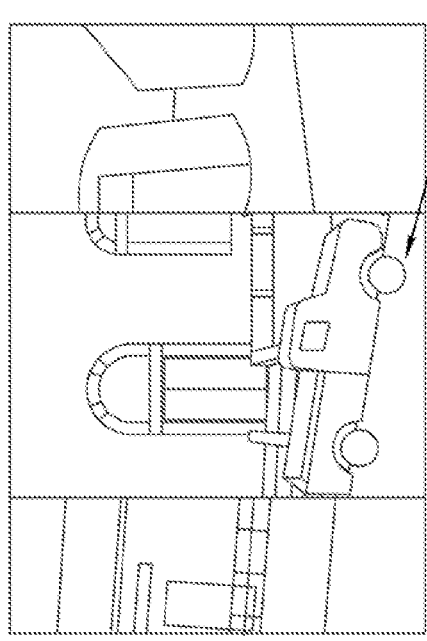
FIG. 11d is a diagram illustrating an image acquired by the device shown in FIG. 10.

In addition, because device 1001 is programmable, a system (not shown) that uses the device can flexibly determine which parts of the field of view to acquire in an image. Therefore, using an appropriate image tracking algorithm and various components as illustrated in FIG. 7, the system can track the objects by dynamically changing the transmittance pattern of the apertures, based on the position and/or motion of these objects in the scene. This is illustrated in FIGS. 11*c* and 11*d*, wherein disjointed fields of view are shifted so that an object 1105 remains in one of the fields of view. It should be noted that this functionality of tracking a moving object in one of multiple fields of view on a single image detector can be implemented with any other suitable technology that provides a highly controllable imaging device.

From a practical perspective, it is desirable to use a small number of attenuating layers. This, however, limits the set of scene-to-image mappings that can be implemented with a lensless imaging device (e.g., device 300) to those defined in Proposition 1 of Appendix A. However, if a certain desired mapping cannot be achieved with the device, an alternative mapping can be implemented and the desired mapping can then be obtained computationally, as described below. In this way, the set of mappings of such a device can be extended.

Figure 12:
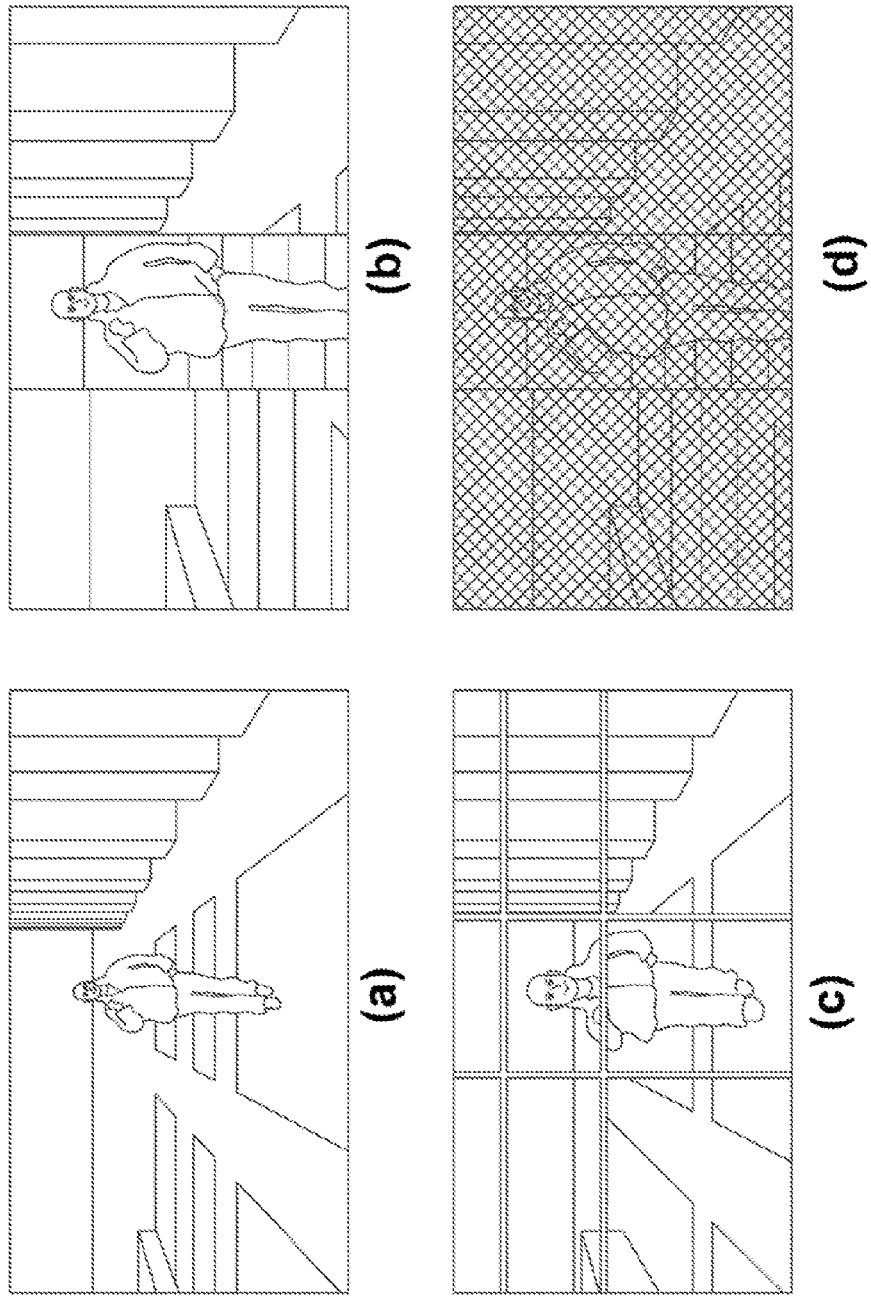
FIG. 12a is a diagram illustrating an image acquired by a conventional camera.
FIG. 12b is a diagram illustrating an image having different resolutions with respect to different portions of the image.
FIG. 12c is a diagram illustrating an image having different resolutions with respect to different portions of the image.
FIG. 12d is a diagram illustrating an image acquired by a device according to various embodiments of the present invention.

Consider a surveillance system for detecting and analyzing moving objects of interest over a large area. To detect objects with a minimal delay, the system needs to maintain an updated wide view of the scene, as illustrated by FIG. 12*a*. On the other hand, the system needs to acquire an image of certain objects at a higher resolution for analysis. For example, as illustrated in FIG. 12*b*, an image of a scene is subdivided horizontally into three parts, each acquired at a different resolution. Another example is illustrated in FIG. 12*c*, where non-uniform resolution is applied to parts of a scene subdivided horizontally and vertically.

Figure 13:
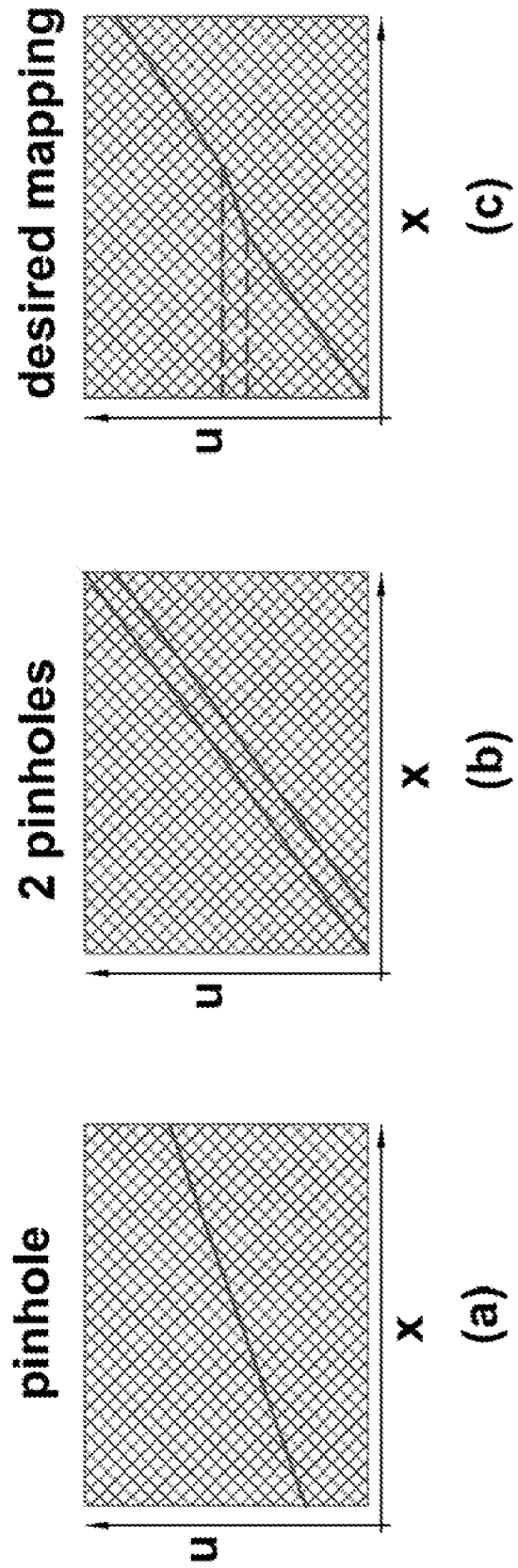
FIG. 13a is a diagram illustrating a scene-to-image mapping corresponding to a device of various embodiments of the present invention using one aperture.
FIG. 13b is a diagram illustrating a scene-to-image mapping corresponding to a device of various embodiments of the present invention using two apertures.
FIG. 13c is a diagram illustrating a desired scene-to-image mapping.

FIGS. 13*a*-13*c* illustrate the scene-to-image mappings where u parameterizes the scene and x parameterizes the image. FIG. 13*a* illustrates a single aperture mapping, and FIG. 13*b* illustrates a mapping due to two open apertures. The slopes of the lines in FIGS. 13*a* and 13*b* correspond to the resolution of the acquired image and are determined by the focal lengths. FIG. 13*c* is the desired scene-to-image mapping. In this mapping, portions of an image corresponding to different parts of a scene are acquired at different focal lengths. Therefore, different portions of the image have different resolutions as shown in FIG. 12*b* or FIG. 12*c*. The mapping in FIG. 13*c* subdivides the image to three regions, each region with its own magnification ratio.

A different mapping illustrated in FIG. 14a is implemented by a device 1401 of various embodiments of the present invention, as illustrated in FIG. 14b. Device 1401 can be used to acquire an image of objects at spatially varying resolution. An image acquired by device 1401 is illustrated in FIG. 12d, which is similar to the image in FIG. 12b but with additional blur.

As shown, device 1401 includes three light attenuating layers 1407a, 1407b, and 1407c, on which various apertures are formed. For example, aperture 1405 is formed on layer 1407a. Layer 1407a also include a larger aperture 1409 containing aperture 1405, allowing light from a wide field of view to be acquired by device 1401. As shown, image detector 1411 can acquire an image of a field of view having portions represented by regions Fov1, Fov2, and Fov3. An image corresponding to region Fov2, for example, is acquire with a longer focal length than an image corresponding to region Fov3, because aperture 1405 corresponding to region Fov2 is located further away from image detector 1411 than aperture 1403 which corresponding to region Fov3. Hence, an image of different portions of the scene can be acquired with different resolutions.

Figures 15A, 15B, 15C:
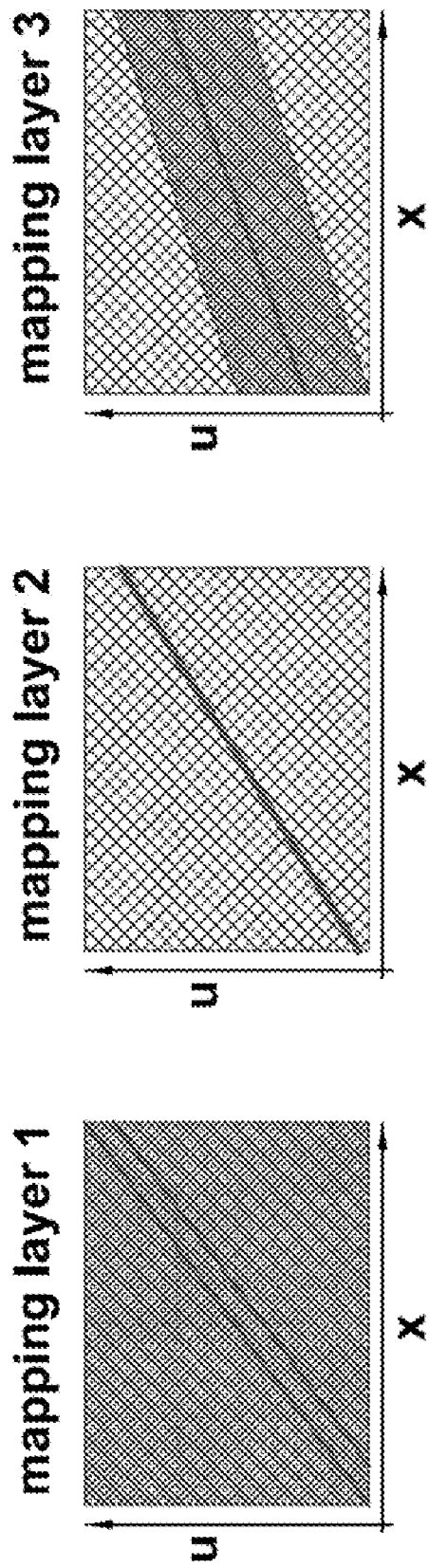
FIG. 15a is a diagram illustrating a scene-to-image mapping induced by a first light attenuating layer of the device in FIG. 14b.
FIG. 15b is a diagram illustrating a scene-to-image mapping induced by a second light attenuating layer of the device in FIG. 14b.
FIG. 15c is a diagram illustrating a scene-to-image mapping induced by a third light attenuating layer of the device in FIG. 14b.

FIGS. 15a, 15b, and 15c illustrate the mappings induced by the three aperture layers 1407c, 1407b, and 1407a respectively, whose product is the desired mapping illustrated in FIG. 14c. As can be seen from FIG. 15a, the first layer 1407c contains two apertures and otherwise a small positive transmittance $\epsilon$ (e.g., $\epsilon$=0.1). FIG. 15b shows that layer 1407b has zero transmittance except in a narrow strip. FIG. 15c shows that layer 1407a has an aperture (1405) surrounded with a larger aperture (1409) of a constant positive transmittance $\epsilon$. Although device 1401 is shown as having three light attenuating layers 1407a, 1407b, and 1407c, the functionality of simultaneously acquiring images of different portions of a scene with different magnification ratios on a single image detector can be implemented with any other suitable technology that provides a highly controllable imaging device.

Blur introduced by device 1401 can be removed computationally. For example, the desired image in FIG. 12b can be computationally reconstructed from the image in FIG. 12d. The desired mapping illustrated in FIG. 13c and the actual mapping illustrated in FIG. 14a are represented by matrices $W_x$ and $C_x$, respectively. In the case of varying resolution in both x and y, as illustrated in FIG. 12c, similar matrices are used for they direction, $W_y$ and $C_y$. The reconstruction can be applied separately to the rows and columns of the acquired image $I_{captured}$:

$$I_{desired} = W_y C_y^+ I_{captured} (C_x^T)^+ W_x^T \quad (4)$$

where $C_y^+$ denotes the pseudo-inverse of $C_y$. Here, the matrix $(C_x^T)^+ W_x^T$ multiplies the image rows whereas the matrix $W_y C_y^+$ multiplies the image columns.

Other embodiments, extensions, and modifications of the ideas presented above are comprehended and within the reach of one skilled in the art upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

APPENDIX A

Camera Mappings for Distant Scenes

When the scene is distant relative to the size of the camera, the scene-to-image mapping can be approximated by a depth-independent mapping. Here we derive this mapping. To keep notations simple, the derivation is given for a one-dimensional imaging device. The generalization to a 2D device is straightforward. It is further assumed that the scene is a plane parallel to the image plane at distance z. This assumption only simplifies notations. Otherwise, one can associate a z value with each image point and derive a similar result under visibility assumptions.

Proposition 1: Define an imaging device composed of an image plane and an attenuating aperture. The aperture is a set of K parallel flat layers at distances $f_1 \ldots f_K$ from the image plane. Let $0 < T_j(x) \leq 1$, $1 \leq j \leq K$ be the transmittance functions of the layers. The image is acquired by the image detector, a finite imaging area centered at the origin of the image plane. Let $S_f(u)$ be an image of a pinhole camera with the pinhole at distance $f_1$ from the center of the image detector. Then, the image brightness at point x is given by:

$$I(x) = \int \prod_{j=1}^{K} T_j\left(x - u\frac{f_j}{f_1}\right) S_f\left(u + (u-x)\frac{f_1}{z - f_1}\right) du. \quad (5)$$

Define w as an upper bound on the width of the camera (aperture and detector). Then, in the limit, when $z \gg w$ and $z \gg f_1$:

$$I(x) = \int \prod_{j=1}^{K} T_j\left(x - u\frac{f_j}{f_1}\right) S_f(u) du \quad (6)$$

Figure 16:
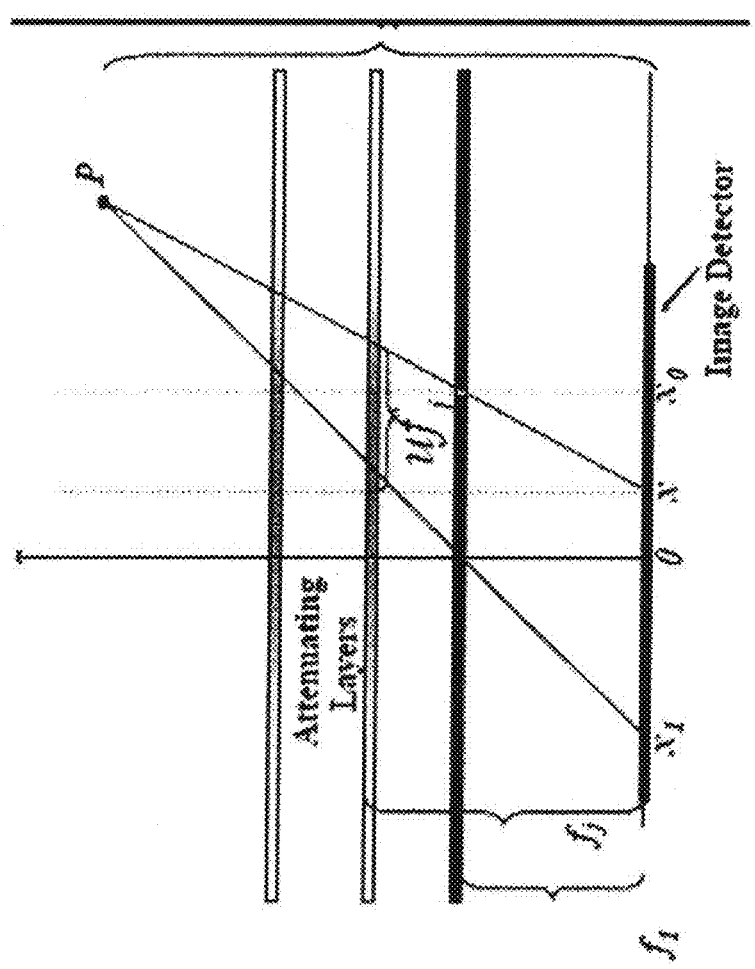
FIG. 16 is a diagram used for proving a proposition in Appendix A.

Proof: Consider FIG. 16, showing the camera and a scene point P. In this camera functionality, the first layer is blocked except for a pinhole opening at offset $x_0$. Scene point P is projected through the pinhole to image point x. Were the pinhole located at offset 0, point P would be projected to point $x_1$. Since $S_f$ is the pinhole image for offset 0, the image brightness at point x is given by:

$$I_{x_0}(x) = \prod_{j=2}^{K} T\left(x + (x_0 - x)\frac{f_j}{f_1}\right) S_f(x_1). \quad (7)$$

Note that here we implicitly assumed that the radiance emanating from P towards $x_1$ equals the radiance emanating from P towards x. This approximation depends on the distance of the scene and on the reflectance properties of the scene. For a scene that is distant relative to the size of the camera, the solid angle at point x subtended by a pinhole at location $x_0$ and the solid angle at point $x_1$ subtended by a pinhole at location 0 can be approximated to be the same.

From similarity of triangles, $(x-x_1)/z = x_0/(z-f_1)$. Reorganizing terms, $x_1 = x - x_0 - x_0 \cdot f_1/(z-f_1)$. Substituting $u = x - x_0$ in the former equation and plugging into equation (7):

$$I_{x_0}(x) = \prod_{j=2}^{K} T\left(x - u\frac{f_j}{f_1}\right) S_f\left(u - (x-u)\frac{f_1}{z-f_1}\right). \quad (8)$$

So far we assumed that the first attenuating layer only has one aperture created. For a general transmittance pattern in the first layer, we simply integrate equation (8) over u:

$$I(x) = \int \prod_{j=2}^{K} T\left(x - u\frac{f_j}{f_1}\right) S_f\left(u - (x-u)\frac{f_1}{z-f_1}\right) du. \quad (9)$$

We have derived the mapping of the scene to the image, as expressed in equation (6). When there is only one attenuating layer with transmittance function T, equation (6) becomes:

$$I(x) = \int T(x-u) S_f(u) du \quad (10)$$

and therefore a shift of the pinhole by d pixels induces a shift of the image by d pixels:

$$I(x) = \int \delta(x-u-d) S_f(u) du, \quad (11)$$

where δ denotes Dirac's delta function.

What is claimed is:

1. An optical device for acquiring an image, the device comprising:
   a light attenuating layer having a plurality of elements, each element having a transmittance, wherein the transmittance of each of the plurality of elements is controllable;
   a light attenuating layer controller connected to the light attenuating layer that is configured to simultaneously control the transmittance of each of the plurality of elements independent of each other; and
   an image detector disposed at a distance from and substantially parallel to the light attenuating layer, the image detector configured to acquire an image from light that passes through the light attenuating layer;
   wherein the optical device acquires the image without using a lens.

2. The device of claim 1, wherein the light attenuating layer comprises a liquid crystal sheet.

3. The device of claim 1, wherein the light attenuating layer comprises a digital micromirror device.

4. The device of claim 1, wherein the light attenuating layer comprises a liquid crystal on silicon device.

5. The device of claim 1, wherein the transmittance of each of the plurality of elements of the light attenuating layer is controllable between at least one translucent state and at least one opaque state.

6. The device of claim 1, wherein the light attenuating layer controller is further configured to create at least one aperture within the light attenuating layer, the at least one aperture comprising at least one element of the light attenuating layer having a higher transmittance than elements surrounding the at least one aperture.

7. The device of claim 6, wherein the light attenuating layer controller is further configured to move the at least one aperture within the light attenuating layer.

8. The device of claim 6, further comprising:
   an image analyzer coupled to the image detector, the image analyzer configured to detect an image of a moving object within a first image acquired by the image detector;
   a position determination component coupled to the image analyzer, the position determination component configured to determine a first position of the moving object image within the first image; and
   a view determination component coupled to the position determination component, the view determination component configured to determine a field of view expected to contain the moving object at a later time based on the determined first position, wherein the light attenuating layer controller is further configured to move the at least one first aperture to a second position within the first light attenuating layer corresponding to the determined field of view, thereby enabling the image detector to acquire a second image containing the moving object at the later time.

9. The device of claim 6, further comprising:
   at least one additional light attenuating layer disposed at a distance from the image detector different from that of the light attenuating layer, wherein the light attenuating layer controller is further configured to create at least one additional aperture within the at least one additional light attenuating layer.

10. The device of claim 9, wherein the light attenuating layer controller is further configured to form a plurality of disjointed fields of view.

11. The device of claim 10, further comprising:
    an image analyzer coupled to the image detector, the image analyzer configured to detect an image of a moving object within a first image acquired by the image detector;
    a position determination component coupled to the image analyzer, the position determination component configured to determine a first position of the moving object image within the first image; and
    a view determination component coupled to the position determination component, the view determination component configured to determine a second field of view expected to contain the moving object at a later time based on the determined first position, wherein the light attenuating layer controller is further configured to move the at least one aperture and the at least one additional aperture to change one of the plurality of disjointed fields of view to the second field of view, thereby enabling the image detector to acquire a second image containing the moving object at the later time.

12. The device of claim 9, wherein the light attenuating layer controller is further configured to create within the at least one additional light attenuating layer at least one second additional aperture containing the at least one additional aperture, the at least one second additional aperture having a transmittance lower than the at least one additional aperture.

13. The device of claim 12, further comprising:
    an image processing component, wherein the image detector acquires an image of distinct parts of a scene at different focal lengths; and
    wherein the image processing component is configured to computationally remove blur in the image acquired by the image detector.

14. The device of claim 9, wherein the light attenuating layer controller is further configured to create an image template representing an object within the light attenuating layer, the image template, the at least one aperture, and the at least one additional aperture being located such that an image of a scene and a correlation image formed by applying an optical correlation or convolution of the scene with the image template are both acquired by the image detector.

15. The device of claim 14, further comprising:
    an image analyzer coupled to the image detector and the light attenuating layer controller, wherein the image analyzer is configured to detect an image of the object within the acquired image of the scene using the acquired correlation image.

16. A method of acquiring an image using a lensless imaging device, comprising:
  providing a light attenuating layer having a plurality of elements, each element having a controllable transmittance, a light attenuating layer controller connected to the light attenuating layer, and an image detector disposed at a distance from and substantially parallel to the light attenuating layer;
  using the light attenuating layer controller to simultaneously control the transmittance of the plurality of elements of the light attenuating layer independent of each other; and
  acquiring the image using the image detector from light that passes through the light attenuating layer, wherein the image is acquired without using a lens.

17. The method of claim 16, further comprising using the light attenuating layer controller to control the transmittance of the plurality of elements of the light attenuating layer between at least one translucent state and at least one opaque state.

18. The method of claim 16, further comprising:
  using the light attenuating layer controller to create at least one aperture within the light attenuating layer, the at least one aperture comprising at least one element of the light attenuating layer having a higher transmittance than elements surrounding the at least one aperture; and
  using the light attenuating layer controller to move the at least one aperture within the light attenuating layer.

19. The method of claim 16, further comprising:
  acquiring a first image from the light that passes through an aperture of the light attenuating layer;
  detecting an image of a moving object within the first image;
  determining a first position of the moving object image within the first image;
  determining a field of view expected to contain the moving object at a later time based on the determined first position;
  moving the aperture to a second position corresponding to the determined field of view without moving the imaging device; and
  acquiring a second image with the determined field of view.

20. The method of claim 16, further comprising:
  creating an image template representing the object and an aperture;
  acquiring a correlation image formed by applying an optical correlation or convolution of the scene with the image template;
  acquiring an image of the scene using the aperture;
  computing a normalized correlation of at least a portion of the acquired scene image using the acquired correlation image; and
  detecting an image of the object in the acquired scene image based on the computed normalized correlation.

* * * * *